Patented July 8, 1952

2,602,807

UNITED STATES PATENT OFFICE 2,602,807

RECOVERY OF CATALYST FROM HYDROGENATED OIL

Charles E. Morris and Frank P. Khym, Chicago, Ill., assignors to Armour and Company, Chicago, Ill., a corporation of Illinois No Drawing. Application December 26, 1945,
Serial No. 637,292

8 Claims. (Cl. 260—409)

This invention relates to recovery of catalyst of the removable type from hydrogenated oil, as through filtering and the like.

In the hydrogenation of edible oils it is common to mix the oils with a catalyst and subsequently, after hydrogenation, to remove the catalyst from the oil. In continuous hydrogenation processes the catalyst is mixed with the oil and hydrogenation is accomplished under elevated temperatures and pressures in the presence of the catalyst and thereafter the hot oil is passed through a deodorizing and degassing tower and finally through a cooling tank to storage. In the course of such a process, the catalyst is normally removed shortly after the hydrogenation step and sometimes it is removed after the deodorizing step. In some processes, the filtering operation is employed at both stages.

In the filtering operations, considerable difficulty has been experienced in removing the catalyst, which is usually a nickel catalyst. In the ordinary filtering of hydrogenated oil, complete removal of the catalyst is not effected. The resulting oil is quite dark in color, assuming an appearance which is similar to orange pekoe tea. Even in subsequent bleaching operations, the catalyst remained in the oil and the above color was not modified substantially. The ordinary bleaching clays were not effective for removing the catalyst.

An object of the present invention is to provide a method for the complete removal of the hydrogenation catalyst so that a clear filtrate is obtained. A further object is to provide a method whereby the removal of the hydrogenation catalyst can be accomplished with a slight modification of the present filtering operation to produce a clear product. Other specific objects and advantages will appear as the specification proceeds.

We have discovered that if a slight amount of acid is incorporated in the clay slurry employed in the filtering of the oil, the clay which was theretofore ineffective in the removal of the catalyst becomes completely effective in bringing about the removal of the catalyst. The acid may be incorporated in the clay at any desired stage prior to the filtering operation. If desired, an acidified or acid leached clay may be used for this purpose. For example, a clay which has been leached out with a solution of sulphuric acid and then later pulverized is found satisfactory.

As an example of the process, we have brought about clarification of oils which otherwise were unfilterable by the addition of a few one hundredths of 1% of 85% syrupy phosphoric acid. The acid was added directly to the bleaching clay in the bleaching kettle. More specifically, good results were obtained by adding from .01% to .04% of such phosphoric acid to the clay at the time the bleaching or clarification operation was performed.

Instead of phosphoric acid, sulphuric acid and other acids which do not interfere with the edible properties of the oil may be used, and so long as the amount of the acid is sufficient to bring the clay over to the acid side. Any such acid which is non-toxic and does not interfere with the edible properties of the oil, either because it is non-toxic per se or because it is used in such relatively small amounts that it has no injurious effect, will be found satisfactory. We have found, however, that phosphoric acid and sulphuric acid are particularly advantageous in the carrying out of the process.

As an example of the use of acid activated clay, we find that from 0.50 to 1.0%, when incorporated in the oil prior to its being pumped to the hydrogenation tank, was effective in the obtaining of a clear filtrate after the hydrogenation step.

Another effective method in the use of the acidified clay is to pump a 10% clay and oil slurry into the filter so as to coat and cover the surfaces in the filter just prior to the passing of the oil and catalyst mixture into the filter. The acidified clay slurry is found to be very effective when mixed with the oil at or just prior to the filtering operation.

The process is inexpensive in that very minute amounts of acid are required and relatively small amounts of the acid treated clay are required. The oil is immediately freed of the catalyst and a clear filtrate, which could not heretofore be obtained by the use of large amounts of untreated clay, is obtained.

While in the foregoing process, we have set forth specific details as illustrative of the process, it will be understood that such details may be modified widely by those skilled in the art without departing from the spirit of our invention.

We claim:

1. In a process for the recovery of a removable nickel catalyst from hydrogenated oil, the steps of incorporating clay and an acid taken from the group consisting of sulphuric and phosphoric acid, with the oil, and filtering the mixture.

2. In a process for recovering removable nickel catalyst from hydrogenated oil, the steps of incorporating clay and an acid selected from the group consisting of phosphoric acid and sulfuric acid with the oil and filtering the mixture.

3. In a process for the recovery of a removable nickel catalyst from hydrogenated oil, the steps of incorporating a slurry containing clay and an acid selected from the group consisting of phosphoric acid and sulfuric acid with the oil and filtering the mixture.

4. In a process for the recovery of a removable nickel catalyst from hydrogenated oil, the steps of incorporating clay acidified with an acid selected from the group consisting of phosphoric acid and sulfuric acid with the oil and filtering the mixture.

5. In a process for the recovery of a colloidal suspension of nickel catalyst from hydrogenated oil, the steps of filtering the oil to remove substantially all of the nickel catalyst except a colloidal suspension thereof, incorporating clay acidified with an acid selected from the group consisting of phosphoric acid and sulfuric acid, and filtering the mixture to remove said colloidal suspension of catalyst and clay.

6. In a process for the recovery of a removable nickel catalyst from hydrogenated oil, the steps of incorporating phosphoric acid and bleaching clay with the oil and filtering the mixture.

7. In a process for the recovery of removable nickel catalyst from hydrogenated oil, the steps of mixing a clay, leached with a solution of sulphuric acid, with the hydrogenated oil and filtering the mixture.

8. In a process for the recovery of removable nickel catalyst from hydrogenated oil, the steps of mixing clay, leached with a solution of sulphuric acid, with a small amount of the oil to form a slurry, mixing the slurry with the mass of the hydrogenated oil just before filtering the mixture and then filtering the mixture.

CHARLES E. MORRIS.
FRANK P. KHYM.

REFERENCES CITED

The following references are of record in the file of this patent:

UNITED STATES PATENTS

| Number | Name | Date |
| --- | --- | --- |
| 1,224,291 | Ellis | May 1, 1917 |
| 1,476,330 | Ellis | Dec. 4, 1923 |
| 2,322,186 | Black | June 15, 1943 |

OTHER REFERENCES

Kalichevsky et al.: Chemical Refining of Petroleum, revised ed., Reinhold Pub. Co., page 255.

Wurster: Ind. Eng. Chem., 32, 1193–1199 (1940).